(12) United States Patent
Damkjaer

(10) Patent No.: US 7,364,038 B2
(45) Date of Patent: Apr. 29, 2008

(54) CONVEYOR BELT LINK INCORPORATING ONE OR MORE ROLLERS

(75) Inventor: Poul Erik Damkjaer, Vejle (DK)

(73) Assignee: Uni-Chains A/S (DK)

( * ) Notice: Subject to any disclaimer, the term of this patent is extended or adjusted under 35 U.S.C. 154(b) by 50 days.

(21) Appl. No.: 11/525,143

(22) Filed: Sep. 20, 2006

(65) Prior Publication Data

US 2007/0089970 A1  Apr. 26, 2007

(30) Foreign Application Priority Data

Sep. 20, 2005  (DK) ................................ 2005 91308

(51) Int. Cl.
*B65G 17/06* (2006.01)
(52) U.S. Cl. .................. 198/853; 198/845; 198/850
(58) Field of Classification Search ................ 198/779, 198/845, 850, 753
See application file for complete search history.

(56) References Cited

U.S. PATENT DOCUMENTS

| | | | |
|---|---|---|---|
| 4,394,901 A * | 7/1983 | Roinestad .................... 198/850 |
| D420,777 S * | 2/2000 | Damkjær ..................... D34/35 |
| 6,148,990 A | 11/2000 | Lapeyre et al. ............. 198/779 |
| 6,209,714 B1 | 4/2001 | Lapeyre et al. ............. 198/779 |
| 6,347,699 B1 * | 2/2002 | Ramsey ....................... 198/852 |
| 6,367,616 B1 | 4/2002 | Lapeyre et al. ............. 198/779 |
| 6,494,312 B2 | 12/2002 | Costanzo ...................... 198/779 |
| 6,571,937 B1 | 6/2003 | Costanzo et al. ............ 198/779 |
| 6,662,938 B2 * | 12/2003 | Damkjaer .................... 198/852 |
| 6,857,517 B2 * | 2/2005 | Damkjær .................. 198/861.2 |
| 6,986,420 B2 | 1/2006 | Weiser et al. ................ 198/853 |
| 6,997,306 B2 | 2/2006 | Sofranec et al. ............. 198/779 |
| 7,007,792 B1 * | 3/2006 | Burch ..................... 198/457.02 |
| 7,073,651 B2 * | 7/2006 | Costanzo et al. ....... 193/35 MD |
| 7,216,759 B2 * | 5/2007 | Rau et al. .................... 198/853 |
| 7,249,669 B2 * | 7/2007 | Fourney ................. 198/370.09 |
| 2005/0241924 A1 | 11/2005 | Damkjaer .................... 198/853 |
| 2006/0090988 A1 | 5/2006 | Damkjaer .................... 198/852 |

FOREIGN PATENT DOCUMENTS

| | | |
|---|---|---|
| EP | 0 427 337 A1 | 5/1991 |
| EP | 1 306 323 A2 | 5/2003 |
| EP | 1 367 009 A1 | 12/2003 |
| EP | 1 398 282 A2 | 3/2004 |
| WO | 2005/073111 A1 | 8/2005 |

* cited by examiner

*Primary Examiner*—Douglas A Hess
(74) *Attorney, Agent, or Firm*—Woodcock Washburn LLP

(57) ABSTRACT

A conveyor comprising an endless conveyor belt made from a plurality of rows of hinged interconnected belt links where each row extends in a width direction substantially perpendicular to a traveling direction of the belt and comprises at least one link, where substantially all links further comprise a front end, a back end, a top surface, a bottom surface, a pair of opposing side surfaces, front hinge parts and rear hinge parts for a pin-less connection, at least one roller aperture provided through the thickness of the link, the at least one roller aperture comprising at least one axle receiving, guiding, and retaining means, such that an axle may be arranged substantially parallel to the top surface, and a roller arranged coaxially with the axle.

36 Claims, 6 Drawing Sheets

CONVEYOR BELT LINK INCORPORATING ONE OR MORE ROLLERS

FIELD OF THE INVENTION

The present invention relates to a conveyor belt link as well as a conveyor belt comprising a plurality of belt links having rollers.

BACKGROUND OF THE INVENTION

It is known in the art of conveyor belts to have endless belt conveyor assemblies. Usually, this construction is made by providing apertures in the front and back hinge parts of a belt link perpendicular to the travelling direction. By overlapping the hinge parts of two adjacent chain or belt links, and inserting a transverse rod through the apertures, thereby connecting two adjacent links in a hinge-like manner, the two adjacent links will begin to form a conveyor belt.

Such prior art constructions are known from, for example, EP 427337, EP 1306323, and others.

Conveyor belts that incorporate one or more rollers are also known in the art. These types of conveyors are utilized where items are transported from a first station to a second station, and where the second station may not be able to handle the items as quickly as they are forwarded to this station. Therefore, instead of having to slow down the conveying belt or stop the belt all together, the conveying belt is provided with means such that the conveyor belt may continue to rotate and the articles or items transported on the conveying belt will remain in place regardless of the continued circulation of the conveying belt.

These types of accumulating conveying belts have also been designed such that some of the prior art devices may have means arranged below the upper run of the conveyor belt which may be activated such that the rollers provided in or on the conveying belt may be brought to rotate in a direction that is different from the general direction of the conveying belt whereby objects or items transported on the main conveying belt due to the odd angle of rotation of the rollers will be transported in a direction not parallel to the general transport direction of the main conveying belt.

Examples of conveying belt structures of the type mentioned above are known, for example, EP 1398282, WO 2005/073111, U.S. Pat. No. 6,148,990, and EP 1367009.

EP 1367009, which uses the same basic structure as disclosed in EP 1398282, comprises a number of links where the links include a number of rollers that are layered by means of axles in apertures provided in the links. Each link comprises an upper and a lower link section where means for accommodating the axle around which the roller rotates are provided in both the upper and the lower link. The axle has a roller mounted around the axle and positioned in an accommodating means at the desired angle in, for example, the lower link. When all the rollers and corresponding axles have been placed at the desired orientations in the accommodating means provided in the lower link, the upper link is superposed on top of this and assembled either by special assembly means or by inserting a pin through eye parts provided at the leading and trailing edge of each link such that a traditional conveyor belt assembly may be achieved. The axle accommodating means is provided with a certain degree of play such that the rollers due to gravity will be at the lower part of the accommodating means in which position the rollers will not extend beyond the top surface of the conveyor belt. By providing rails at predetermined positions underneath the upper run of the conveyor belt, these rails will force the rollers upwards and thereby force the axle to the upper end of the accommodating means, in which the rollers will extend above the surface of the conveyor belt such that the accumulating capability of the conveyor belt or the side tracking of the items on the conveyor belt may be achieved. By arranging the rails and actuating the rails underneath the upper run of the conveyor belt, it is possible to control and guide items/objects transported on the upper side of the conveyor belt to certain locations as may be desired. This allows the transfer of items to an adjacent conveyor belt or to singulate the items, i.e., by forcing them towards the central part whereby the items will intermesh and substantially form a single file.

In WO 2005/073111, a system is disclosed where rollers or balls may be arranged in belt links and maintained in position by a retainer ring such that once the roller has been arranged in the desired position, the retainer ring will be welded onto the belt link and thereby fixing the angle at which the roller axle of the roller is arranged in relation to the general transport direction of the conveying structure. In embodiments where balls are used, the retainer ring is fastened around the ball such that the ball will extend above the surface of the conveying belt by different fastening means such as welding, screwing, or tap engagement means between the retainer ring and the belt link.

A system of retainers is also used in U.S. Pat. No. 6,148,990 in order to retain the balls in apertures provided in the belt link. The retainer members may be fastened for example by clicking the retainer into engagement with the belt link. In other embodiments, rollers may be arranged in cup shaped holders which may be accommodated inside the belt link in order to provide for the accumulating feature. When the system of cups is used, a substantially universal orientation of the rollers may be achieved simply by orientating the cups in the desired position. This prior art also drives a system of axles and rollers where the rollers are imbedded in apertures provided, in particular, in the upper part of a belt link and the axles are inserted from underneath in through going bores in the belt link which may be superposed with a through going hole in the roller such that the roller may be arranged and the axles held in the belt link by appropriate holes in the belt link's structure.

Common for the above mentioned prior art techniques is the fact that the assembly of the belt links with the rollers is quite cumbersome. In the instances where pins need to be inserted through a roller superposed with further holes in the belt link, a time consuming and labor-intensive process is needed. Furthermore, from a hygienic point of view, it is highly undesirable to have items arranged in the conveying belt structure which may not be readily accessed. Common for all the samples of embedding rollers or balls in belt link structures where retainer means, either retainer rings or retainer members are used, is the fact that none of the links are easy to clean. They require quite costly and labor-intensive assembly procedures. In the case of breakage, it is more economical to replace the entire belt link than simply replace one single roller.

Also the common problem with the prior art devices is the fact that when it is desirable to activate the rollers such that objects are transported in a direction different from the general transport direction of the conveying belt, this is achieved by arranging a number of rails underneath the surface of the upper run of the conveying belt. Where the rollers are installed as suggested in WO 2005/073111, EP 137009, and EP 398282, it is substantially impossible to alter the transport direction because the rollers are welded or in other ways inaccessibly arranged in the link.

Finally, when it is desirable to utilize these types of conveying belts within the food industry, none of the prior art devices are able to fulfil the high requirements of cleanliness. The retaining members of the prior art devices accumulate dust and debris from the goods transported on the conveying belt which may be potential beds for bacteria growth or other possible contamination sources. Further, the rollers mounted by inserting pins across the entire belt link, the apertures provided in the belt link and surrounding the pins have historically proven to be quite impossible to clean. Also common for the four types of prior art devices mentioned above is the fact that the conveyor belt is assembled from a number of substantially identical belt links. The belt links include recesses and eye parts along the leading and trailing edges. Recesses and eye parts are offset in relation to each other such that the eye parts along the leading edge may be inserted into the recesses along the trailing edge of the adjacent link. Apertures provided perpendicular to the transport direction in the eye parts may be superposed such that an insertion of a pin will connect two adjacent belt links in a hinge-like manner. This type of assembly is quite common within the technical field and has proved again and again that to be extremely difficult and very costly to attain and maintain at a high standard of hygiene.

It is consequently an object of the present invention to alleviate these disadvantages and provide a conveying belt structure made up from a number of substantially identical belt links where easy and easily accessible rollers are provided and pin-less connections used in order to connect adjacent belt links.

SUMMARY OF THE INVENTION

The invention addresses the issues mentioned above by providing a conveyor comprising an endless conveyor belt made from a plurality of rows of hinged interconnected belt links, where each row extends in a width direction substantially perpendicular to a traveling direction of the belt and comprises at least one link, where substantially all links further comprise a front end substantially parallel to the width direction, a back end substantially parallel to the width direction, a top surface, a bottom surface; wherein the top surface and the bottom surface have a thickness therebetween, a pair of opposing side surfaces, front hinge parts separated by first apertures arranged along the front end and having a top portion and a bottom portion that are substantially flush with the top surface and bottom surface respectively, two side portions, a free front portion, and protrusions on one or both side portions of a plurality of the front hinge parts each having an inner surface opposite the front end, rear hinge parts separated by second apertures arranged along the back end such that the front hinge parts of a link will correspond with the second apertures on the back end of an adjacent link, and having a top portion and a bottom portion that are substantially flush with the top surface and bottom surface respectively, two side portions, a free front portion, and third apertures provided in the side portions of the rear hinge parts such that the protrusions on the front hinge parts correspond with the third apertures on an adjacent link, at least one roller aperture provided through the thickness of the link, the at least one roller aperture comprising at least one axle receiving, guiding, and retaining means, such that an axle may be arranged substantially parallel to the top surface, and a generally cylindrical roller arranged coaxially with the axle.

In a further embodiment, a belt link for assembly into a conveyor belt, comprising a top surface, said top surface extending in both a traveling direction of the conveyor belt and a width direction perpendicular to the traveling direction, wherein the traveling direction and the width direction define a link plane, a bottom surface substantially opposite to said top surface, wherein the top surface and the bottom surface have a thickness therebetween, a front end and a back end connecting said top surface with said bottom surface, a pair of opposing side surfaces, front hinge parts separated by first apertures arranged along the front end and having a top portion and bottom portion that are substantially flush with the top surface and bottom surface respectively, two side portions, a free front portion, and protrusions on one or both side portions of a plurality of the front hinge parts each having an inner surface opposite the front end, rear hinge parts separated by second apertures arranged along the back end such that the front hinge parts of the link will correspond with the second apertures on the back end of an adjacent link, and having a top portion and bottom portion that are substantially flush with the top surface and bottom surface respectively, two side portions, a free front portion, and third apertures provided in the side portions of the rear hinge parts such that the protrusions on the front hinge parts correspond with the third apertures on an adjacent link, at least one roller aperture provided through the thickness of the link, the at least one roller aperture comprising at least one axle receiving, guiding, and retaining means, such that an axle may be arranged substantially parallel to the top surface, and a generally cylindrical roller arranged coaxially with the axle.

The pin-less connection between adjacent belt links alleviates the need for pins in order to assemble two adjacent belt links. This has a number of advantages. In use, thorough cleaning and thereby attaining a high hygienic standard may be achieved in that the cleaning problems associated with pins and holes are not present. From a production point of view, the pinless design means that moulds, or moulding machine capacity, for pins are not needed, and the conveyor belt links may be readily assembled upon leaving the injection moulding machine for example by means of a robot.

This technique has previously been the subject matter of the applicant's prior application filed in Denmark having no. PA 2004 00638 which hereby is incorporated by reference.

The particular provision of front and rear hinge parts avoids the use of eye parts and recesses in combination with pins in order to assemble adjacent conveyor belt links and thereby provides a pin-less assembly. The problems associated with the traditional type of assembly has been discussed above, and the particular relationship between the protrusions on the front hinge parts and the keyhole shaped apertures provided in the rear hinge parts provides for an easy to assemble link structure which may be assembled and disassembled without the use of special tools and which makes it possible to attain a rather high hygienic standard. At the same time by defining the relative sizes between the cross section of the protrusions in relation to the neck portion of the keyhole shaped apertures, a relatively safe and firm engagement is provided between adjacent belt links.

The axle receiving, guiding, and retaining means are integral with the belt link, therefore, no further means are necessary in order to retain the axles and thereby the rollers in the belt links.

This provides a number of advantages. First, the assembly may be achieved in a fast and economic way because the generally cylindrical rollers, whether they are integrated with the axles or with separate axles, may be easily pushed into the axle receiving, guiding, and retaining means. Second, the injection moulding process that the belt links typically are manufactured with can easily be used to mould the axle receiving, guiding, and retaining means with great precision during the same injection moulding process as the rest of the link. No extra tools, time consuming processes or the like are necessary in order to injection mould the links according to the present invention.

In an alternative embodiment, the axle receiving, guiding, and retaining means are constructed as part of a generally cylindrical insert that can then be fit into the roller aperture of the belt link in such a way that it is both retained but can rotate around the inner circumference of the roller aperture. This allows for the roller to be oriented so as to rotate in any desired direction across the plane of the belt link. In a preferred version of such an embodiment, the generally cylindrical insert includes a tab or other engagement means on its bottom portion that is accessible from the underside of the conveyor belt during use to allow for re-orientation of the cylindrical insert and, thereby, the roller during use.

In order to repair a roller or axle, should the need arise, the entire structure may easily be accessed from above. Simply by inserting a screw driver or other suitable tool, the roller including the axle may be forced out of the axle receiving, guiding, and retaining means and a new axle can be inserted. The rollers may be made as cylindrical members having an aperture in which the axle may be fitted or may be moulded as one unit, i.e., the cylindrical part of the roller can be integral with the axle. In the prior art as discussed above, the replacement of a single roller is a cumbersome and costly procedure, especially in cases where the failure of one single roller may cause the entire conveying structure to be inoperable. It is, therefore, advantageous to be able to quickly, easily, and with as little interruption of the overall process as possible to repair the conveying structure in order to bring it back to full production again.

Furthermore, in situations where the roller extends above and below the upper surface and the bottom surface of the link, both positions facilitate that the conveying link may be integrated in a conveyor belt of the accumulating type without further sub-structure in order to facilitate the accumulating characteristics of the assembled conveyor belt. On the other hand, as is evident from further embodiments of the invention, means arranged under the upper run of the conveyor belt may selectively engage the section of the roller which extends below the bottom surface of the belt link such that a forced movement of the goods transported on the conveyor belt structure may be induced.

In a further advantageous embodiment, the conveyor belt link is provided with front hinge parts along the front end where each notch comprises a main body on which the main body of the at least one protrusion is provided integral therewith, and that the at least one protrusion projects from the main body in a direction substantially parallel to the front end. Further, the protrusion can have a large cross section width of "a". The conveyor belt link can also include rear hinge parts that are arranged along the back end, where the rear hinge parts comprise keyhole shaped apertures extending substantially perpendicular to the upper side. The keyhole shaped aperture can define a neck portion and a substantially circular section, such that the width of the neck portion "b" is smaller or equal to "a" and that the diameter of the circular section is equal to or larger than "a".

In a further advantageous embodiment, independent belt links may be arranged parallel to identical or substantial identical belt links and connected to said in parallel arranged belt links by means of a holes passing through the parallel belt links that are orientated parallel to the front end and where the holes go substantially through the width from one side of a link to the other, such that two or more links may be arranged with aligned holes and assembled by inserting a pin through or substantially through the holes in the two or more links. In this manner, two, three or more separate conveyor belt chains may be assembled to a relatively wide conveyor belt structure.

Furthermore, in order to provide special characteristics, for example, singulating characteristics or other desired movements of the items transported on the conveyor belt structure, one or more chains may be replaced in order to provide chains where the rollers are arranged at the desired angle, such that the structure may easily and quickly be altered to provide various functions simply by replacing one or more of the in parallel arranged chains. In this connection, a chain is made up of a number of conveyor belt links having a limited sideways extension such that by arranging a number of these chains in parallel, they together constitute the conveying belt. Furthermore, by connecting them by one single pin spanning cross-wise through a number of parallelly arranged chains, a uniform transport surface is provided. As not every single conveyor belt link in each chain needs to be provided with a hole and a pin, only every fifth or tenth conveyor belt link needs to be provided with a pin in order to maintain a substantially consistent conveying surface. The disadvantages provided with pin assembly and holes as discussed above have thus minimized, and thereby a relatively high hygienic standard may be accomplished.

In a further advantageous embodiment, the axle receiving, guiding, and retaining means are arranged in the inside wall of the aperture, and the receiving means has a key-hole section, such that one end of the key-hole is a semi-round recess, which recess is in connection with a diverging substantially linear recess, connecting the semi-round recess with the top surface of the link, and where the narrowest section of the diverging recess is equal or smaller than the diameter of the axle, and that the semi-round recess has a diameter equal to or larger than the diameter of the axle.

The keyhole structure causes the axle of the rollers to be guided into the semi-round recess in which the axle and the roller is free to rotate. The diverging recess being part of the keyhole shape, aids in guiding the axle towards the semi-round recess for its final lodgement. The semi-round recess has a size that is slightly larger than the diameter of the axle such that the axle may freely rotate without friction against the keyhole shaped recess. Obviously the length of the axle must be less than the distance from the bottom of the keyhole recess to the bottom of the keyhole recess opposite across the diameter of the aperture in the conveyor belt link.

In a further advantageous embodiment, the center of the semi-round recess is positioned substantially centrally in the link thickness. It is hereby assured that by dimensioning the rollers such that the largest diameter is greater than the thickness of the link, the roller will extend both above the top surface and below the bottom surface of the belt link.

In a still further advantageous embodiment, the axle receiving, guiding, and retaining means are arranged at even angles in the apertures, such that each axle may be arranged in any predefined angle in relation to the front end of the link, where the angles are provided in standard increments of a full circle divisible by two. By providing more axle receiving, guiding, and retaining means along the periphery of the aperture, each roller may be mounted in the receiving means in a number of different angles in relation to the overall transport direction of the conveyor belts. As each axle requires two axle receiving, guiding and retaining means arranged diametrically opposite, it is advantageous to provide the axle retaining means in predefined angles such that full circle will be in standard increments divisible by two.

The invention also includes an embodiment where the generally cylindrical roller and the axle are injection moulded as one single piece from an injection mouldable plastic material, and in particular from the same material as the belt link.

In the art, it is customary to manufacture the rollers from either a metal or plastic material and the axles from steel. The steel axles are chosen in order for the rollers to be able to carry/transport the loads applied from the goods transported on the conveying structure. The drawback of using steel axles is the generation of black dust, due to the interaction of the axles, rollers, belt links, and the conveyor carrying/propelling structure. This black dust may be transferred to the products transported on the conveyor, which for a number of applications, is highly undesirable, as is the case in, for example, food and textile production. The problem is further aggravated in applications where the conveyors are washed because the black dust will create discolouring. This is particularly undesirable when handling foodstuff, such as meat, pizzas, and the like.

In a still further embodiment, at least two of the semi-round recesses provided in the aperture are arranged such that the generally cylindrical roller only extends above the top surface.

For certain types of conveyors it is not necessary to provide the possibility of actuating the rollers to rotate with a different speed or direction, but only the accumulating effect is necessary. Therefore, by providing the axle receiving, guiding, and retaining means such that the rollers only project above the top surface is sufficient for these applications. On the other hand where more than one pair of axle receiving, guiding, and retaining means are provided in the apertures, one or more of these pairs may be arranged such that the roller will extend both above and below the belt link.

As is evident from the description and the accompanying drawings, the axle receiving, guiding, and retaining means must come in pairs in order to accommodate both ends of the axle about which the roller rotates.

The invention also relates to a conveyor belt assembled from a plurality of belt links according to any of the embodiments described above wherein a surface arranged under the carrying surface along the upper run of the conveyor may engage the section of the rollers extending below the belt link, and cause the rollers to rotate. In this manner, it is possible, depending on the orientation of the rollers, to make the objects or items transported on the assembled conveyor belt move in a direction different from the overall direction of the conveyor belt. The surface arranged under the carrying surface may selectively be engaged or disengaged and does not necessarily need to be orientated in exactly the same direction as the rollers to which it will engage in that the resulting speed of the roller will, to a certain degree, depend on the angle at which the rollers are arranged.

In a further advantageous embodiment, the surface arranged under the carrying surface along the upper run of the conveyor belt is a second conveyor belt. In this embodiment, by adjusting the speed of the second conveyor belt, the rotational speed of the rollers may be adjusted such that the articles transported on the conveying surface may be accelerated in the direction of the conveyor belt or in a direction different from the overall travelling direction of the main conveyor belt.

In a further advantageous embodiment, the links can be side-flexing, such as the links illustrated in US 2006-0090988, which is incorporated here by reference.

BRIEF DESCRIPTION OF THE DRAWINGS

The invention will now be explained with reference to the accompanying drawing, wherein.

DETAILED DESCRIPTION OF ILLUSTRATIVE EMBODIMENTS

Figure 1:
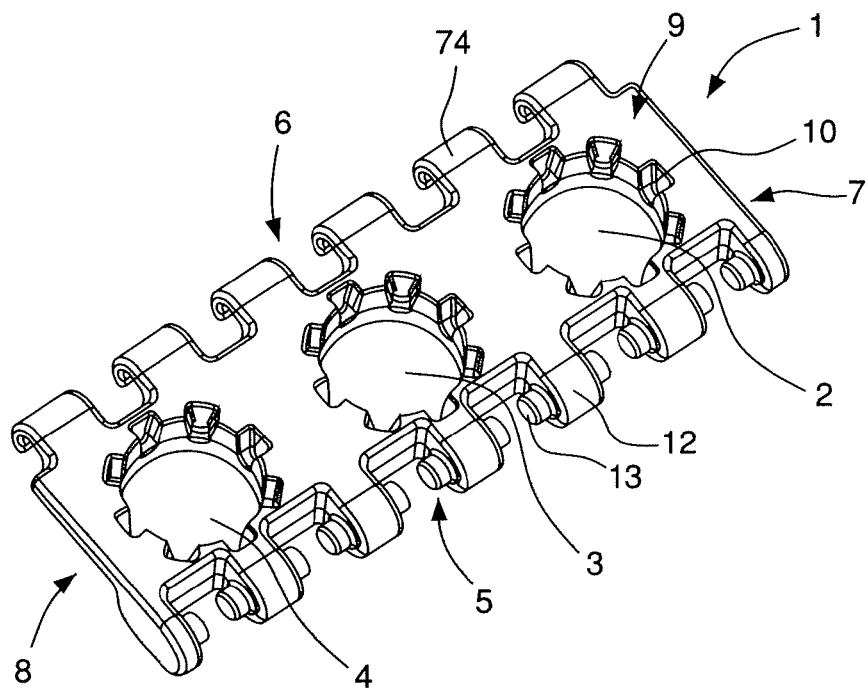
FIG. 1 illustrates a top view of a conveyor belt module or link according to the present invention.

In FIG. 1, a conveyor belt module or link 1 having three apertures 2, 3, and 4 for receiving axles and rollers is illustrated. Internally in the apertures 2, 3, and 4, axle receiving, guiding, and retaining means 10 are arranged. The axle receiving, guiding, and retaining means have a generally keyhole shape configuration as may more readily be seen in FIG. 2.

The link 1 is defined by a front end 5, a back end 6 and two opposing side surfaces 7 and 8. Furthermore, a top surface and a bottom surface 9 and 11 are defined such that a material thickness is provided between the top and the bottom surface. Along the front end 5, front hinge parts 12 are provided that include protrusions 13 that are arranged to project in a direction from the front hinge parts which are parallel to the front end 5. Along the back end, rear hinge parts 14 are provided that may be better deducted from FIG. 2. The rear hinge parts 14 have keyhole shaped apertures 15 such that the protrusions 13 provided on the front hinge parts 12 may be pushed into the keyhole shaped apertures 15 of the rear hinge parts in order to connect one conveyor belt link to an adjacent conveyor belt link. In this manner, a pin-less connection may be provided between the conveyor belt links.

Returning to the apertures 2, 3, and 4, in which the rollers are to be arranged, the axle receiving, guiding, and retaining means 10 can also have a keyhole-shaped configuration. The substantially circular section of the keyhole shape is slightly larger than the diameter of the axle of the roller such that once the axle has been pushed down along the substantially linear converging sides of the keyhole and placed at the bottom of the keyhole, namely in the substantially circular section, the axle is free to rotate without any substantial friction against the walls of the axle receiving, guiding, and retaining means.

The narrowest distance in the keyhole shaped aperture is designed to be equal to or slightly smaller than the diameter of the axle such that the axle of the roller must be forced down through the linear converging part where after it will snap into the semi-circular recess and be maintained in that position due to the narrow section in the keyhole shaped axle receiving, guiding, and retaining means.

As may further be deducted from FIG. 1 in order to maintain an axle in its correct position, two axle receiving, guiding, and retaining means are provided facing each other, i.e., at 180° apart from each other. Therefore, the apertures 2, 3, and 4 are suitable for receiving one set of rollers each, but each roller may be positioned at different angles in relation to the general travelling direction of the modular belt link.

Figure 2:
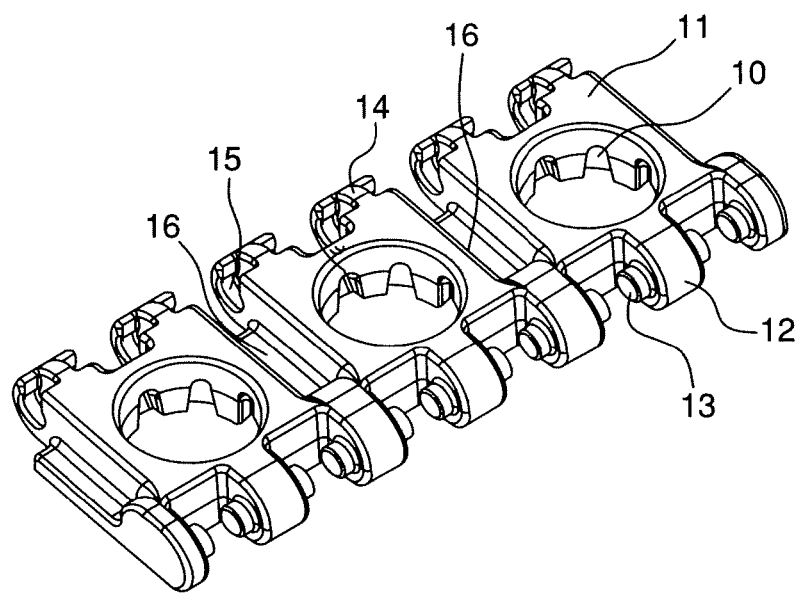
FIG. 2 illustrates a bottom view of the conveyor belt module or link of FIG. 1.

In FIG. 2, a modular conveyor belt link seen from below is illustrated such that the bottom surface 11 is facing upwards. In order to save weight, recesses 16 are provided in the bottom surface 11 such that an overall lighter belt structure may be provided.

Figure 3:
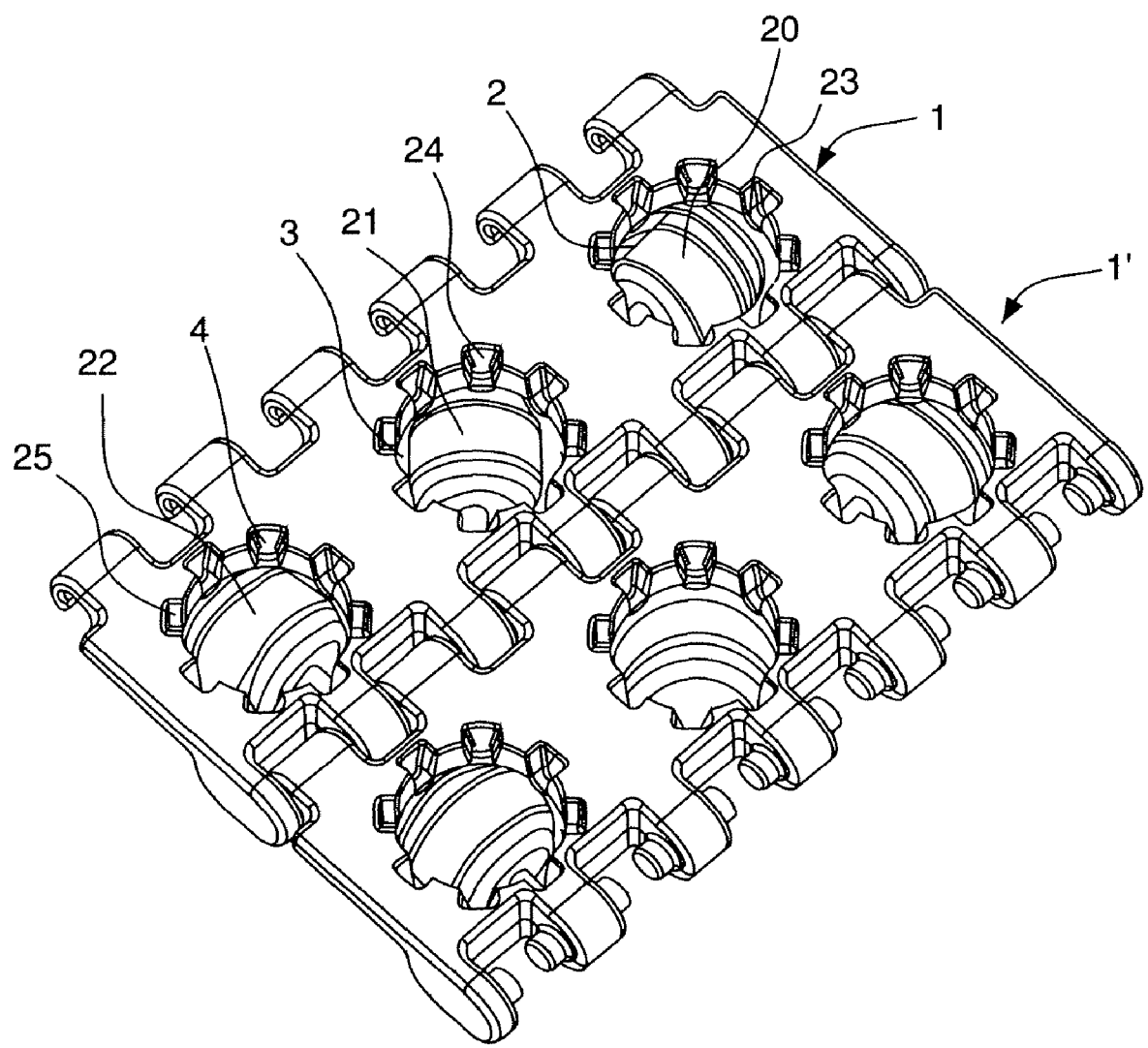
FIG. 3 illustrates a conveyor belt module or link like that of FIG. 1 but including rollers.

In FIG. 3, two substantially identical belt links 1 and 1' have been snapped together by inserting the protrusions 13 of the front hinge parts 12 into rear hinge parts 15 and their like rear hinge part apertures 15. The hinge-like connection is in this manner created between the two adjacent chain belt links 1 and 1' such that one may pivot in relation to the other without interfering with the orientation of the other one.

Furthermore, rollers 20, 21, and 22 have been provided in the apertures 2, 3, and 4. For illustrative purposes only, the orientation of the rollers 20, 21, and 22 are illustrated in three different positions which are made possible due to the configuration of the axle receiving, guiding, and retaining means 10 provided in the sides of the apertures 2, 3, and 4. For practical purposes, it is unlikely that adjacent rollers 20, 21, and 22 will be arranged at different angles. The system, however, makes it possible to give the rollers any desired orientation regardless of the orientation of the adjacent rollers. The rollers 20, 21, and 22 are provided with axles 23, 24, and 25 which are snapped into the axle receiving, guiding, and retaining means such that due to the dimensioning of the narrow part of the keyhole shaped section of the axle receiving, guiding, and retaining keyhole shaped structure, the axles 23, 24, and 25 will be maintained in the semi-circular portion of the keyhole shape.

By connecting a number of belt links 1 and 1' together in the fashion described above and providing rollers at any desirable orientation, the complete conveyor belt structure may be built up. By arranging the rollers at a given orientation, the characteristics of the complete conveyor belt structure may be decided due to the angle of the axles 23, 24, and 25 in relation to the general travelling direction of the conveyor belt.

In the examples described above, each conveyor belt link 1 is provided with three apertures and thereby three rollers. It should, however, be contemplated that belt links can have one or more apertures.

Figure 5:
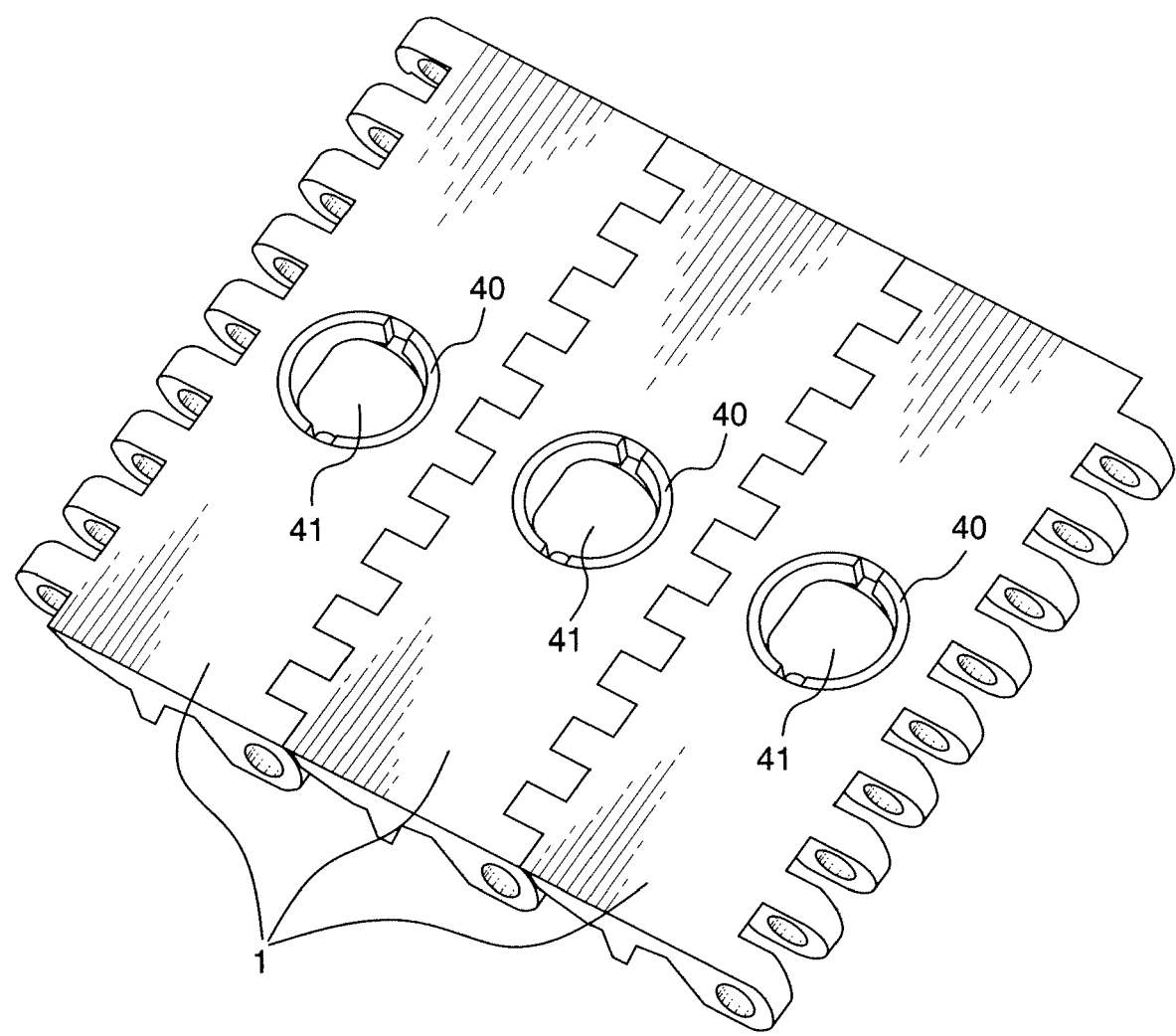
FIG. 5 illustrates an alternative embodiment of the present invention involving cylindrical inserts.
Figure 6:
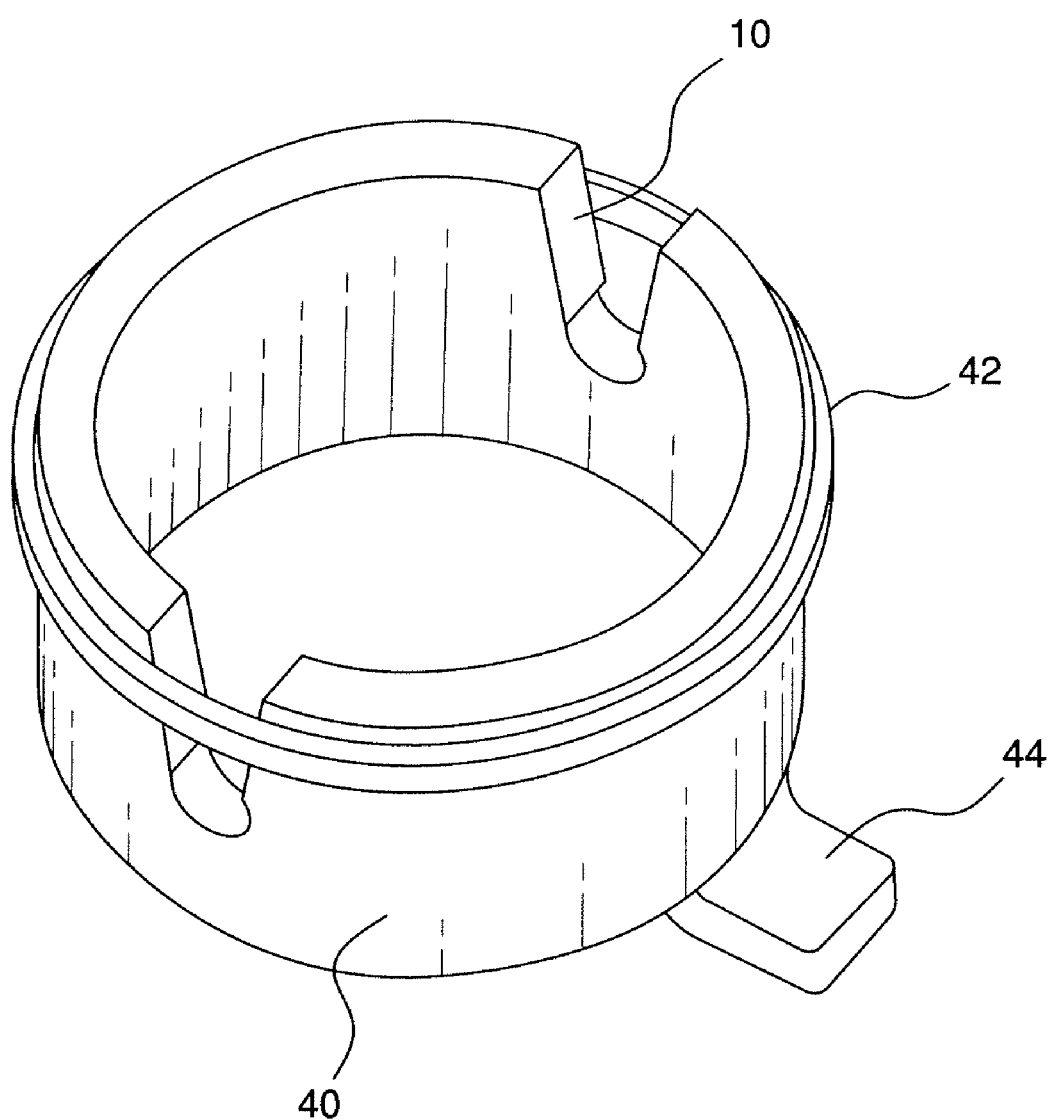
FIG. 6 illustrates a cylindrical insert of the type used in the embodiment of FIG. 5.
Figure 7:
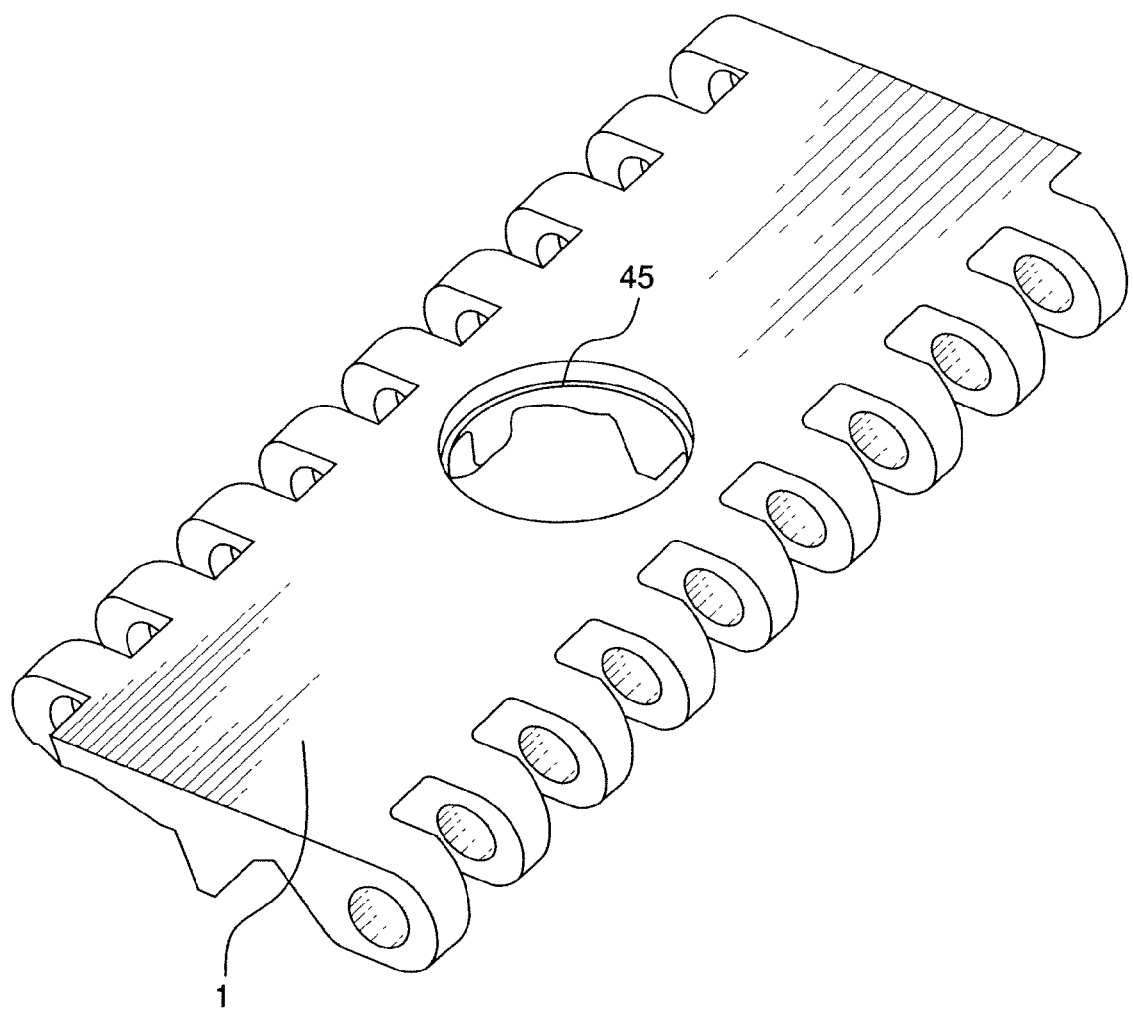
FIG. 7 illustrates a belt link for receiving the cylindrical insert of FIG. 6.

In an alternative embodiment as illustrated in FIGS. 5-7, the axle receiving, guiding, and retaining means 10 are constructed as part of a generally cylindrical insert 40. The insert 40 typically includes a retaining ridge 42 around its outer circumference that can be snap-fit into a retaining groove 45 that is formed around the inner circumference of the roller aperture of a belt link. After being snap-fit, the insert 40 is both retained within the aperture but can rotate around the inner circumference of the roller aperture. This allows for the roller 41 to be oriented so as to rotate in any desired direction across the plane of the belt link 1. While this embodiment involves a snap-fit arrangement, any arrangement that allows for both retention and rotation can be used.

In a preferred version of such an embodiment, the generally cylindrical insert 40 includes a tab or other engagement means 44 on its bottom portion that is accessible from the underside of the conveyor belt during use to allow for re-orientation of the insert 40 and, thereby, the roller 41 during use. With such embodiments, each roller or group of rollers can be readily re-oriented to serve different purposes while the belt is in use.

For some applications of the present invention, it may be desirable to have a very wide conveying surface. In order to solve this requirement, the belt links 1 and 1' may be manufactured having a substantial width and thereby having a number of apertures in order to address this desire. In an alternative embodiment, lines may be coupled together to form a wider belt.

The belt links may be made from one or more of the following groups of materials: plastics such as PP, PE, PVC, acetal and others where the materials may comprise additives such as silicone oils, Teflon®, and the like, and, in particular, plastic materials particularly suitable for moulding and injection-moulding; metals, either castable metals such as steel, copper, aluminium, and suitable alloys or in sheet form where the blanks made from, for example, steel or aluminium are processed, for example, by rolling, bending or shaping into belt links; and composites, either comprising resins or cement as binders and optionally fibre-reinforced composites, where fibres may be chosen from glass-, plastic-, steel-, cellulose- or other suitable fibres.

The choice of material naturally depends on the particular application of the conveyor belt and the supporting conveyor structure. For a number of applications, especially in the food processing industry, belt links made from a plastics material are preferred, whereas in other industries, depending on the environment in which the conveyor is operating, other materials may be preferred.

Depending upon the properties desired in the final belt link product, the raw materials used may be wholly or partially comprised of electrically-conductive materials, non-flammable materials, glass-reinforced materials, UV-stable materials, and/or anti-microbial materials. Moreover, it is also possible for each belt link to be moulded in two or more stages whereby particular additive materials are not included in all of the moulding components.

Particularly when working with the pin-less belt link modules of the present invention where adjacent modules may rub against each other rather than against a connecting pin, there is a possibility of increased noise levels when the conveyor is in operation. The additives, such as Teflon®, serve to reduce the operating noise and heat generated by the belt links and/or the friction between the links. It should be noted that the choice of additives for specific applications, such as in the food processing industry, must also be suitable and approved for the particular use. Usually, the additives are added to the raw materials from which the links are manufactured such that the additives, and thereby the advantageous features of the additives, are integral in the materials used. This can be done, for example, by mixing pellets of the additive with the other raw material(s) on site just prior to moulding. Alternatively, it is also possible to have pre-mixed pellets.

Figure 4:
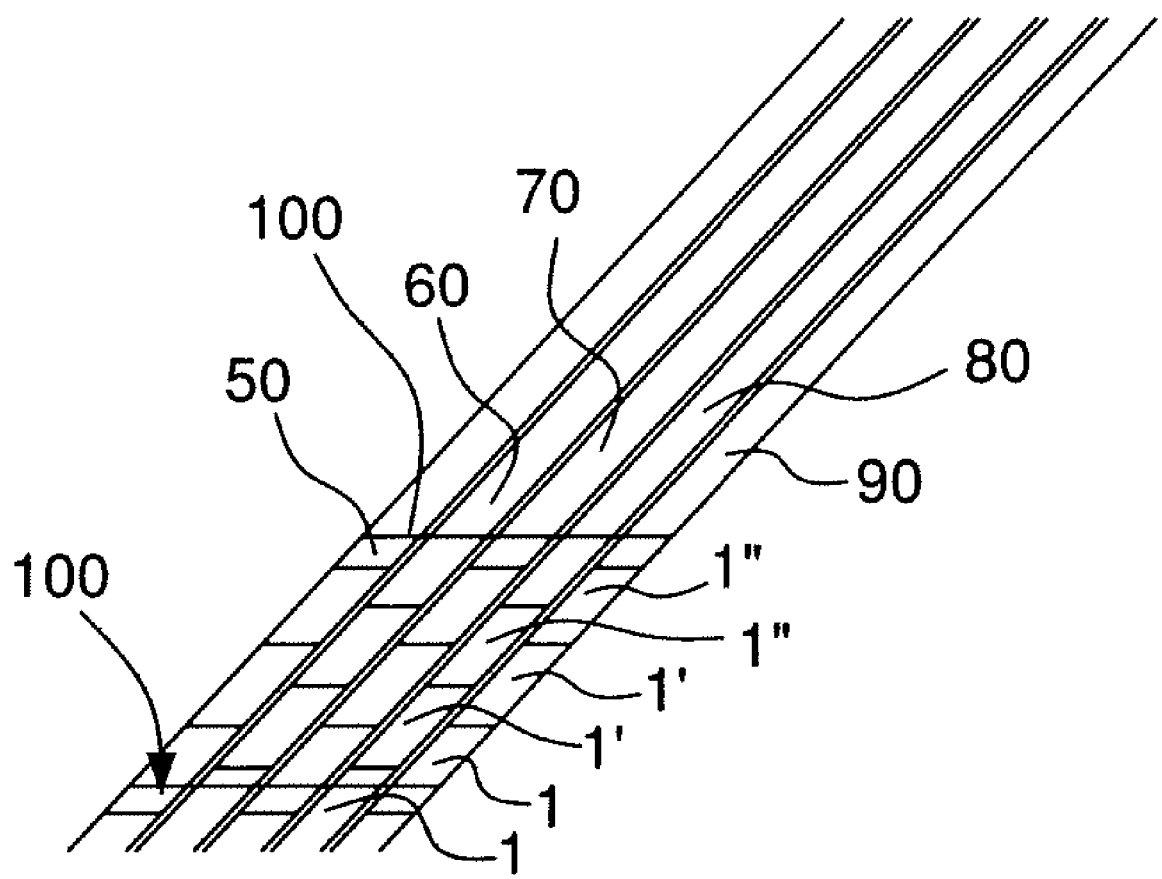
FIG. 4 illustrates a belt constructed from a number of parallelly arranged module belts some having connection pins.

In FIG. 4, in order to illustrate the principle, the conveyor belt links are not illustrated in their actual sizes. In the illustrated embodiment, five identical belt chains 50, 60, 70, 80, and 90 are illustrated. Each belt chain 50, 60, 70, 80, and 90 may be made up from links as depicted in FIGS. 1 through 3 or belt links having different widths, i.e. comprising one, two, three, four or five or more rollers as described above. Each chain belt therefore comprises a number of belt links 1, 1', 1'', etc. to make the five parallelly-arranged chain belts act as one. The links may be interconnected perpendicularly to the general travelling direction indicated by the arrow A by means of a pin 100 spanning through all the parallelly-arranged belt chains 50, 60, 70, 80, and 90. The pin is in this embodiment illustrated by reference number 100. Pins 100 may be provided at relatively large intervals for example for every fifth or tenth belt link such that the problems relating to cleaning etc. may be minimised. Furthermore, in this embodiment, the pins 100 is illustrated as going through all the conveyor chain belts but may also only penetrate the centrally arranged conveyor belts 60, 70, and 80 and not penetrate the outermost chain belts 50 and 90 such that substantially flush and unhindered side edges of the conveyor belts 50 and 90 may be obtained. The pins 100 can be lodged in holes that are provided perpendicular to the general travelling direction and approximately centrally in the thickness defined by the upper side and the bottom surface of each individual belt link 1, 1'.

It is noted that the foregoing examples have been provided merely for the purpose of explanation and are in no way to be construed as limiting of the present invention. For example, several of the figures, including FIG. 3, depict the conveyor links 1 and 1' including only 7 front hinge parts and 6 rear hinge parts. The number of front and rear hinge parts may vary, however, based on the width of the link itself. For example, if the conveyor belt has a width equal to the width of one link, the link may contain a significantly greater amount of front and rear hinge parts. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed:

1. A conveyor comprising an endless conveyor belt made from a plurality of rows of hinged interconnected belt links, where each row extends in a width direction substantially perpendicular to a traveling direction of the belt and comprises at least one link, where substantially all links further comprise:
    a front end substantially parallel to the width direction;
    a back end substantially parallel to the width direction;
    a top surface;
    a bottom surface; wherein the top surface and the bottom surface have a thickness therebetween;
    a pair of opposing side surfaces;
    front hinge parts separated by first apertures arranged along the front end and having a top portion and a bottom portion that are substantially flush with the top surface and bottom surface respectively, two side portions, a free front portion, and protrusions on one or both side portions of a plurality of the front hinge parts each having an inner surface opposite the front end;
    rear hinge parts separated by second apertures arranged along the back end such that the front hinge parts of a link will correspond with the second apertures on the back end of an adjacent link, and having a top portion and a bottom portion that are substantially flush with the top surface and bottom surface respectively, two side portions, a free front portion, and third apertures provided in the side portions of the rear hinge parts such that the protrusions on the front hinge parts correspond with the third apertures on an adjacent link;
    at least one roller aperture provided through the thickness of the link, the at least one roller aperture comprising at least one axle receiving, guiding, and retaining means, such that an axle may be arranged substantially parallel to the top surface; and
    a roller arranged coaxially with the axle.

2. The conveyor of claim 1, wherein the roller extends above the top surface of the link.

3. The conveyor of claim 1, wherein the roller extends below the bottom surface of the link.

4. The conveyor of claim 1, wherein the roller is integral with the axle.

5. The conveyor of claim 1, further comprising one or more holes orientated parallel to the front end of each row of links and extending substantially through the width of the row, such that two or more links may be arranged with superposed holes and assembled by inserting a pin through or substantially through the holes in the two or more links.

6. The conveyor of claim 1, wherein the axle receiving, guiding, and retaining means are arranged in an inside wall of the roller aperture, and that the receiving means has a key-hole section such that one end of the key-hole is a semi-round recess, the semi-round recess is in connection with a diverging substantially linear recess connecting the semi-round recess with the top surface of the link, and where the narrowest section of the diverging recess is equal or smaller than the diameter of the axle, and that the semi-round recess has a diameter equal to or larger than the diameter of the axle.

7. The conveyor of claim 6, wherein the center of the semi-round recess is positioned substantially centrally in the link thickness.

8. The conveyor of claim 6, wherein at least two semi-round recesses are provided in the roller aperture and are arranged such that the roller extends above the top surface but not below the bottom surface.

9. The conveyor of claim 1, wherein the roller aperture includes a retaining groove around its circumference and the axle receiving, guiding, and retaining means are arranged in an inside wall of generally cylindrical insert having a retaining ridge around its outer circumference that is fit into the retaining groove of the roller aperture, and further where the axle receiving, guiding, and retaining means has a key-hole section such that one end of the key-hole is a semi-round recess, the semi-round recess is in connection with a diverging substantially linear recess connecting the semi-round recess with the top surface of the link, and where the narrowest section of the diverging recess is equal or smaller than the diameter of the axle, and that the semi-round recess has a diameter equal to or larger than the diameter of the axle.

10. The conveyor of claim 9 wherein the insert has a bottom portion and further comprising an engagement means on the bottom portion of the insert.

11. The conveyor of claim 1, wherein the axle receiving, guiding, and retaining means are arranged at even angles in the roller aperture such that each axle may be arranged in any of several predefined angles in relation to the front end of the link.

12. The conveyor of claim 1, wherein a plurality of axle receiving, guiding, and retaining means are provided in pairs, each pair arranged across the roller aperture from each other, and the pairs arranged in standard increments around the circumference of the roller aperture.

13. The conveyor of claim 1, where one or both of the roller and the axle are injection moulded as a single piece from an injection mouldable plastic material.

14. The conveyor of claim 1, wherein a first engaging surface arranged under the bottom surface along an upper run of the conveyor may engage the rollers extending below the bottom surface of the link, thereby causing the rollers to rotate.

15. The conveyor of claim 14, wherein the first engaging surface is a second conveyor belt.

16. The conveyor of claim 1 wherein the links are made of a plastic that includes one or more additives selected from lubricating materials, electrically-conductive materials, non-flammable materials, glass reinforced materials, UV-stable materials, and anti-microbial materials.

17. The conveyor of claim 1, wherein the conveyor belt has a width that corresponds to the width of one link.

18. The conveyor of claim 1, wherein, when viewed from the bottom surface, the first apertures have a generally keyhole-shaped configuration and wherein the rear hinge parts are generally rectangular and have a width in the width direction that is just less than the narrowest section of the keyhole-shaped first apertures such that it is possible for gas and liquid to pass through the belt from the top surface to the bottom surface when two adjacent links are pushed together.

19. The conveyor of claim 1, wherein a plurality of the protrusions have elongated cross-sections in the traveling direction such that the length of these protrusions in the traveling direction is greater than the height of these protrusions in a direction perpendicular to the top surface, and wherein there are recesses in the side portions of the rear hinge parts between the elongated apertures and the bottom portion of the rear hinge parts that have a length in the traveling direction that is greater than the height of these hinge part protrusions but less than the length of such protrusions in the traveling direction.

20. The conveyor of claim 1, wherein the third apertures are elongated in the traveling direction.

21. A belt link for assembly into a conveyor belt, comprising:
    a top surface, said top surface extending in both a traveling direction of the conveyor belt and a width direction perpendicular to the traveling direction, wherein the traveling direction and the width direction define a link plane;
    a bottom surface substantially opposite to said top surface, wherein the top surface and the bottom surface have a thickness therebetween;
    a front end and a back end connecting said top surface with said bottom surface;
    a pair of opposing side surfaces;
    front hinge parts separated by first apertures arranged along the front end and having a top portion and bottom portion that are substantially flush with the top surface and bottom surface respectively, two side portions, a free front portion, and protrusions on one or both side portions of a plurality of the front hinge parts each having an inner surface opposite the front end;
    rear hinge parts separated by second apertures arranged along the back end such that the front hinge parts of the link will correspond with the second apertures on the back end of an adjacent link, and having a top portion and bottom portion that are substantially flush with the top surface and bottom surface respectively, two side portions, a free front portion, and third apertures provided in the side portions of the rear hinge parts such that the protrusions on the front hinge parts correspond with the third apertures on an adjacent link;
    at least one roller aperture provided through the thickness of the link, the at least one roller aperture comprising at least one axle receiving, guiding, and retaining means, such that an axle may be arranged substantially parallel to the top surface; and
    a roller arranged coaxially with the axle.

22. The belt link of claim 21 wherein the link is made of a plastic that includes one or more additives selected from lubricating materials, electrically-conductive materials, non-flammable materials, glass reinforced materials, UV-stable materials, and anti-microbial materials.

23. The belt link of claim 21, wherein, when viewed from the bottom surface, the first apertures have a generally keyhole-shaped configuration and wherein the rear hinge parts are generally rectangular and have a width perpendicular to the traveling direction that is just less than the narrowest section of the keyhole-shaped first apertures.

24. The belt link of claim 21, wherein a plurality of the protrusions have elongated cross-sections in the traveling direction such that the length of these protrusions in the traveling direction is greater than the height of these protrusions in a first direction perpendicular to the link plane, and wherein there are recesses in the side portions of the rear hinge parts between the third apertures and the bottom of the rear hinge parts that have a length in the traveling direction that is greater than the height of these front hinge part protrusions but less than the length of such protrusions in the traveling direction.

25. The belt link of claim 21, wherein the roller extends above the top surface of the link.

26. The belt link of claim 21, wherein the roller extends below the bottom surface of the link.

27. The belt link of claim 21, wherein the roller is integral with the axle.

28. The belt link of claim 21, wherein the roller aperture includes a retaining groove around its circumference and the axle receiving, guiding, and retaining means are arranged in an inside wall of generally cylindrical insert having a retaining ridge around its outer circumference that is fit into the retaining groove of the roller aperture, and further where the axle receiving, guiding, and retaining means has a key-hole section such that one end of the key-hole is a semi-round recess, the semi-round recess is in connection with a diverging substantially linear recess connecting the semi-round recess with the top surface of the link, and where the narrowest section of the diverging recess is equal or smaller than the diameter of the axle, and that the semi-round recess has a diameter equal to or larger than the diameter of the axle.

29. The conveyor of claim 28 wherein the insert has a bottom portion and further comprising an engagement means on the bottom portion of the insert.

30. The belt link of claim 21, wherein the center of the semi-round recess is positioned substantially centrally in the link thickness.

31. The belt link of claim 21, wherein the axle receiving, guiding, and retaining means are arranged at even angles in the roller aperture such that each axle may be arranged in any predefined angle in relation to the front end of the link.

32. The belt link of claim 21, wherein a plurality of axle receiving, guiding, and retaining means are provided in pairs, each pair arranged across the roller aperture from each other, and the pairs arranged in standard increments around the circumference of the roller aperture.

33. The belt link of claim 21, where one or both of the roller and the axle are injection-moulded as a single piece from an injection-mouldable plastic material.

34. The belt link of claim 21, wherein at least two semi-round recesses are provided in the roller aperture and are arranged such that the roller extends above the top surface but not below the bottom surface.

35. The belt link of claim 21, wherein the link has a width that corresponds to the width of the conveyor belt.

36. The belt link of claim 21, wherein the third apertures are elongated in the traveling direction.

* * * * *